United States Patent [19]
Holbrook

[11] Patent Number: 5,494,511
[45] Date of Patent: Feb. 27, 1996

[54] DISPERSION

[75] Inventor: Mark Holbrook, Bury, England

[73] Assignee: Zeneca Limited, London, England

[21] Appl. No.: 12,435

[22] Filed: Feb. 2, 1993

[30] Foreign Application Priority Data

Feb. 11, 1992 [GB] United Kingdom ............ 9202838
Oct. 30, 1992 [GB] United Kingdom ............ 9222807

[51] Int. Cl.⁶ .................. C09D 11/10; C09D 7/12
[52] U.S. Cl. ............. 106/401; 106/20 R; 106/23 R; 106/311; 106/400; 106/287.26
[58] Field of Search ................ 106/499, 20 R, 106/23 R, 400, 401, 311, 287.26

[56] References Cited

U.S. PATENT DOCUMENTS

| | | | |
|---|---|---|---|
| 4,373,930 | 2/1983 | Rothwell | 8/527 |
| 4,403,077 | 9/1983 | Uhrig et al. | 525/502 |

FOREIGN PATENT DOCUMENTS

| | | |
|---|---|---|
| 605973 | 11/1934 | Germany. |
| 2251451 | 5/1974 | Germany. |
| 858054 | 1/1961 | United Kingdom. |
| 1400022 | 7/1975 | United Kingdom. |

OTHER PUBLICATIONS

Patton, T. C., ed. "Dispersion of Pigment in Mill Base" in *Pigment Handbook*, vol. III, chapter III–E–a, pp. 391–398, TP936.P38p vol. 3.

*Primary Examiner*—Mark L. Bell
*Assistant Examiner*—Scott L. Hertzog
*Attorney, Agent, or Firm*—Cushman Darby & Cushman

[57] ABSTRACT

A dispersion of a finely divided pigment in a composition of water, one or more water-compatible resins and, as dispersant, a polycyclic aromatic compound having a water-solubilising poly($C_{2-4}$-alkyleneoxy) chain containing from 3 to 50 alkyleneoxy groups, characterised in that the dispersion contains from 3% to 30% by weight or resin with respect to the total weight of water and resin in the dispersion. The dispersion is suitable for the preparation of water-borne paint and inks.

9 Claims, No Drawings

DISPERSION

DISPERSION

This specification describes an invention relating to an aqueous dispersion and especially to an aqueous dispersion of a pigment containing a water-compatible resin and a dispersant suitable as a mill-base in the preparation of a water-borne paint or ink.

Mill-bases for water-borne paints and inks are conventionally prepared by subjecting an aqueous dispersion of a pigment and one or more resins to a grinding operation in order to ensure that the pigment is finely divided and evenly distributed throughout the aqueous resin medium. Although the resin or resins used should be water-compatible, it is recognised that for optimum paint or ink (especially packaging ink) performance (especially durability) the resins used are preferably not water-soluble. Suitable water-insoluble resins may commonly be described as being water dilutable, water dispersible or emulsifiable. However, it has been found that water-insoluble resins do not generally provide sufficient dispersing power to ensure adequate dispersion of the pigment and it is therefore common practice to include water-soluble resins (which generally provide better dispersing power than insoluble resins) in such mill-bases with a consequent adverse effect on the performance of the derived paint or ink. It has now been found possible to provide mill-bases with well-dispersed pigments by the use of a specific class of dispersant. This permits the preparation of well-dispersed mill-bases containing water, water-insoluble resins, pigment and dispersant and little or no water-soluble resin. Surprisingly, the dispersant does not have an adverse effect on the performance of the paint or ink in the same way as the water-soluble resin.

According to the present invention there is provided a dispersion of a finely-divided pigment in a composition comprising water, one or more water-compatible resins and, as dispersant, a polycyclic aromatic compound having a water-solubilising poly($C_{2-4}$-alkyleneoxy) chain containing from 3 to 50 alkyleneoxy groups characterised in that the dispersion contains from 3% to 30% by weight of resin with respect to the total weight of weight of water and resin in the dispersion.

The pigment may be any substantially water-insoluble colorant which may be used for imparting colour to a water-borne paint or ink. Such pigments are generally described in the Colour Index (Third Edition) and subsequent additions and appendices thereto. Preferred pigments are those which are conventionally used in water-borne paints and inks, such as copper phthalocyanines, carbon black, quinacridones, dianthraquinones, monoazo pigments, vat pigments, dioxazine violet, diketopyrrolopyrroles, titanium dioxides and iron oxides. The mean particle diameter of the finely-divided pigment particles is preferably <5 micrometers and more preferably <1 micrometer.

The water-compatible resin may be any water-soluble or water-insoluble polymer or a mixture thereof. However, it is preferred that each resin is water-insoluble because such resins have generally been found to provide paints or inks having better durability than water-soluble resin.

Examples of suitable resins are acrylic, styrene-acrylic, polyester, polyurethane, acrylic-polyurethane, vinyl acetate, vinyl chloride polymers and co-polymers and water-dispersible alkyd resins. Preferred resins are acrylic, styrene-acrylic, polyester, polyurethane and acrylic-polyurethane resins.

The dispersant is preferably of the formula:

$$(A-X-Y)_p-R$$

wherein:

A is a polycyclic aromatic group;

X is a bridging group selected from —O—, —COO—, —S—, —NH— and —NY—;

Y is —$(C_3H_6O)_m$—$(C_2H_4O)_n$— or —$(C_2H_4O)_n$—$(C_3H_6O)_m$—;

m is from 0 to 2n;

m+n is from 3 to 50;

p is 1 or 2;

R is H, $C_{1-4}$-alkyl or —$PO_3M_2$ when p is 1;

R is =$PO_3M$ when p is 2; and

M is H, a metal or optionally substituted ammonium.

It is preferred that the value of p is 1 so that the dispersant contains a single (A—X—Y) group. The polycyclic aromatic group, A, preferably contains two or three fused rings and is more preferably a naphth-1-yl or naphth-2-yl group, especially the latter, which may carry a halogen or $C_{1-4}$-alkyl or $C_{1-4}$-alkoxy substituent, but is preferably unsubstituted. The bridging group X is preferably —O— or —COO— and the dispersant is preferably derived by alkoxylation of a naphthol, especially naphth-2-ol. The value of m+n is preferably from 3 to 30, especially from 5 to 15 and more especially from 8 to 12. The value of m is preferably from o to n and more preferably 0 so that the poly($C_{2-4}$-alkyleneoxy) chain is a polyethyleneoxy chain. Particularly good results have been achieved with naphth-2-yloxy-$(C_2H_4O)_{10}H$. Dispersants of this type are described in GB 2,060,715.

Where M is a metal this is preferably an alkali metal such as sodium or potassium. Where M is optionally substituted ammonium this is preferably $NQ_4$ where each Q independently is H, $C_{1-20}$-alkyl, hydroxy-$C_{1-6}$-alkyl, benzyl or 2 groups Q, together with the nitrogen atom, form a 5- or 6-membered ring such as piperidine, piperazine or morpholine ring.

The present dispersion preferably contains at least 10% and preferably contains up to 80%, both by weight with respect to the total dispersion, of the pigment. Where the pigment is organic or a standard carbon black having a surface area below 200 $m^2/g$, the dispersion may conveniently contain from 20% to 50% by weight of pigment but, where the pigment is inorganic, the dispersion may conveniently contain from 40% to 70% by weight of pigment on the same basis. However, for high to very high surface area carbon black (having a surface area >200 $m^2/g$), the dispersion may contain as low as 3%, but more preferably from 5% to 15%, pigment on the same basis and the amount of dispersant is preferably from 50% to 100% by weight based on the weight of the pigment. The dispersion preferably contains at least 1% and preferably contains up to 100%, both by weight with respect to the weight of pigment, of the dispersant. Where the pigment is an organic pigment or carbon black, the dispersion more preferably contains from 5% to 50% and where the pigment is an inorganic pigment, the dispersion preferably contains from 1% to 10%, both by weight with respect to the weight of pigment in the dispersion, of the dispersant. The dispersion preferably contains at least 5% and more especially at least 10%, both by weight with respect to the total weight of water and resin in the dispersion, of resin. The dispersion preferably contains up to 25% and more preferably up to 20%, on the same basis, of resin.

As already indicated the composition is suitable as a mill-base for the preparation of water-borne paints and inks by admixture with further amounts of water-compatible resin(s) and/or water and other ingredients which are conventionally incorporated into water-borne paints and inks, such as preservatives, stabilisers, antifoaming agents and coalescing agents. Water-borne paints and inks comprising a dispersion according to the present invention are a further feature of the present invention.

It has been found that the present invention allows the preparation of high pigment content mill-bases with good fluidity (low viscosity) which can be used to prepare water-borne paints or inks with particularly useful properties in respect of durability, gloss and moisture resistance of paint or ink films after application and drying of the paint or ink compared with conventional paints and inks.

The present dispersant allows the preparation of superior paints and inks in terms of gloss and foam resistant when compared with other dispersants of equivalent HLB value and in terms of gloss and durability when compared with water-soluble dispersing resins.

The dispersion can be prepared by any of the methods used for the preparation of mill-bases provided that all the components, as hereinbefore defined, are included. Thus, for example, the resin or resins may be dispersed and/or dissolved in water and the dispersing agent and pigment, in a coarse or unmilled condition in which the mean particle diameter is preferably >5 micrometers more especially >10 micrometers, may be added to the mixture which may then be submitted to a high-shear treatment, e.g. bead or ball milling, in order to produce an even dispersion of finely-divided pigment in the aqueous medium. A pre mill-base comprising a suspension of unmilled pigment in water containing the water-compatible resin and the dispersant is also new and forms a further feature of the present invention.

A further advantage of the present invention is that the dispersion has little tendency to foam which makes milling and handling more convenient and avoids or minimises the need for antifoams, which are known to have a deleterious effect on paint or ink performance, in the mill-base. It also allows a reduction in, or avoidance of, the use of water-soluble resins which have an adverse effect on the durability and/or moisture resistance of the resultant paint or ink film.

The invention is further illustrated by the following Examples in which all parts and percentages are by weight unless otherwise indicated. In the Examples the dispersants are identified as follows:

2-naphthol-10EO

The condensate of 1 mole of 2-naphthol with 10 moles of ethylene oxide.

1-naphthol-10EO

The condensate of 1 mole of 1-naphthol with 10 moles of ethylene oxide.

2-naphthol-15EO

The condensate of 1 mole of 2-naphthol with 15 moles of ethylene oxide.

2-naphthoyl-PEG(350)-OCH$_3$

The condensate of 1 mole of 2-naphthoyl chloride with 1 mole of a methoxypolyethyleneglycol of molecular weight 350

2-naphthol-5PO-5EO

The condensate of 1 mole of 2-naphthol firstly with 5 moles of propylene oxide and then 5 moles of ethylene oxide.

2-naphthol-10PO-11EO

The condensate of 1 mole of 2-naphthol firstly with 10 moles of propylene oxide and then 11 moles of ethylene oxide.

2-naphthoic acid +20EO-11PO-OCH$_3$

The condensate of 1 mole of 2-naphthoic acid with 1 mole of a block copolymer prepared by reacting 1 mole of methanol with 10 moles of propylene oxide and then 20 moles of ethylene oxide.

2-naphthol-5EO phosphate

The condensate of 1 mole 2-naphthol with 5 moles ethylene oxide reacted with phosphorus pentoxide at a hydroxyl group to phosphorus ratio of 1:1.

2-naphthol-10EO phosphate

The condensate of 1 mole 2-naphthol with 10 moles ethylene oxide reacted with phosphorus pentoxide at a hydroxyl group to phosphorus ratio of 1:1.

Example 1

A mill-base was prepared by charging 7.0 g dimethyl-quinacridone, MONOLITE Rubine 3B (Zeneca Colours), 11.3 g water, 11.67 g of a 45% solids acrylic copolymer emulsion, NEOCRYL XK90 (Zeneca Resins), 0.32 g of a modified polysiloxane antifoam, DEHYDRAN 1293 (Henkel), 3.76 g monopropyleneglycol and 0.95 g 2-naphthol-10EO to a 120 ml capacity screw cap glass bottle with 125 g 3 mm glass beads and milling for 45 minutes on a Red Devil shaker.

The resulting highly fluid mill-base was diluted to form a paint by the addition of 70.0 g of NEOCRYL XK90. The paint was applied to a primed metal panel with a wire-wound coating bar (100 micrometer wet-film thickness). After air drying for 90 minutes followed by baking at 120° C. for 30 minutes the 20° gloss value of the resultant smooth coating was measured and the result is given in Table 1.

Examples 2 to 9

The procedure detailed in Example 1 was repeated replacing 2-naphthol-10EO with the following dispersing agents. In each case a highly fluid millbase was obtained and the 20° gloss of the final paint film was measured. The results are given in Table 1.

TABLE 1

| Example No | Dispersing Agent | Gloss (20°) |
| --- | --- | --- |
| 1 | 2-naphthol-10EO | 62.70 |
| 2 | 1-naphthol-10EO | 62.08 |
| 3 | 2-naphthol-15EO | 55.42 |
| 4 | 2-naphthoyl-PEG(350)-OCH$_3$ | 60.38 |
| 5 | 2-naphthol-5PO-5EO | 66.24 |
| 6 | 2-naphthol-10PO-11EO | 63.12 |
| 7 | 2-naphthoic acid + 20EO-11PO-OCH$_3$ | 58.50 |
| 8 | 2-naphthol-5EO phosphate | 63.68 |
| 9 | 2-naphthol-10EO phosphate | 58.58 |

Comparative Example 1

Example 1 was repeated except that 2-naphthol-10EO was replaced with water. It was not possible to obtain a fluid mill-base. The final paint film contained many undispersed particles and had a 20° gloss value of 4.12 units.

Comparative Example 2

Example 1 was repeated except that the acrylic copolymer emulsion in the mill-base was replaced with water. The mill-base was more fluid than the mill-base of Example 1 but the 20° gloss of the final paint film was 52.84 units. The paint was also inferior to the paint of Example 1 in respect of colour strength, as visually assessed by 1:25 dilution with a white acrylic copolymer emulsion paint, and flocculation resistance, as assessed by cross-brushing the painted panels.

Example 10

2-Naphthol-10EO (0.95 g) was dissolved in 11.3 g water in a 120 ml capacity screw cap bottle. The solution was shaken vigorously for 15 seconds and the height of the foam above the liquid surface measured. Then 11.67 g NEOCRYL XK90, 3.76 g propylene glycol, 125 g 3 mm glass beads and 7.0 g MONOLITE Rubine 3B were added to the bottle and the mixture milled for 45 minutes on a Red Devil shaker. The height of foam above the liquid surface was measured immediately after milling. The highly fluid dispersion so produced was diluted and applied to a panel as described in Example 1 and the 20° gloss value measured. The results are tabulated in Table 2.

Comparative Examples 3 and 4

The procedure of Example 10 was repeated replacing the 2-naphthol-10EO with nonylphenol-15EO, SYNPERONIC NP15 (ICI), (Comparative Example 3) and $C_{13/15}$ synthetic alcohol+11EO, SYNPERONIC A11 (ICI) (Comparative Example 4) respectively.

These comparative examples were chosen on the basis that the HLB values (calculated according to the equations of Griffin—ref: Porter M. R., Handbook of Surfactants, Blackie, 1991, p42) of the dispersants, SYNPERONIC NP15 (HLB=15.39) and SYNPERONIC A11 (HLB=14.36) are very close to the calculated value for 2-naphthol-10EO (HLB=15.65). The results are tabulated in Table 2.

TABLE 2

|  | Solution Foam Height | Mill-base Foam Height | 20° Gloss Value |
|---|---|---|---|
| Example 10 | No Foam | 5 mm | 64.52 |
| Comp Ex 3 | 35 mm | 35 mm | 57.60 |
| Comp Ex 4 | 65 mm | 35 mm | 57.64 |

Example 11

2-Naphthol-10EO (0.59 g) was dissolved in 14.42 g water in a 120 ml capacity screw cap bottle. The solution was shaken vigorously for 15 seconds and the height of the foam above the liquid surface measured. 9.09 g NEOCRYL XK90, 3.76 g propylene glycol, 0.32 g DEHYDRAN 1293, 125 g 3 mm glass beads and 9.79 g C.I. Pigment Green 36, MONASTRAL Green 6Y, (ICI), were added to the bottle and the mixture milled for 45 minutes on a Red Devil shaker. The highly fluid dispersion so produced was diluted to a paint with 93.0 g NEOCRYL XK90, applied to a panel as described in Example 1 and the 20° gloss value measured. The results are tabulated in Table 3.

Comparative Examples 5 and 6

The procedure of Example 11 was repeated replacing the 2-naphthol-10EO with SYNPERONIC NP15 (Comparative Example 5) and SYNPERONIC A11 (Comparative Example 6) respectively. The results are tabulated in Table 3.

TABLE 3

|  | Solution Foam Height | 20° Gloss Value |
|---|---|---|
| Example 11 | 14 mm | 53.02 |
| Comp Ex 5 | 75 mm | 47.09 |
| Comp Ex 6 | 75 mm | 42.84 |

Examples 12–17 and Comparative Example 7

Millbases were prepared, diluted to paints, coated and tested as detailed in Example 1 using the formulations and giving the results detailed in Table 4:

TABLE 4

|  | Ex 12 | Ex 13 | Ex 14 | Ex 15 | Ex 16 | Comp Ex 7 |
|---|---|---|---|---|---|---|
| Millbase |  |  |  |  |  |  |
| 2-naphthol-10EO | 1.01 | 1.89 | 2.46 | 0.15 | 1.02 | — |
| Water | 7.19 | 12.80 | 5.59 | 6.02 | 3.74 | 4.76 |
| NEOCRYL XK90 | 11.67 | 8.37 | 11.67 | 4.37 | 17.92 | 17.92 |
| Propylene Glycol | 3.76 | 3.62 | 3.76 | 2.50 | 2.70 | 2.70 |
| DEHYDRAN 1293 | 0.32 | 0.31 | 0.32 | 0.21 | 0.23 | 0.23 |
| Pigment A | 1.05 |  |  |  |  |  |
| Pigment B |  | 6.75 |  |  |  |  |
| Pigment C |  |  | 11.20 |  |  |  |
| Pigment D |  |  |  | 10.00 |  |  |
| Pigment E |  |  |  |  | 25.60 | 25.60 |
| Letdown |  |  |  |  |  |  |
| NEOCRYL XK90 | 35.00 | 56.00 | 119.00 | 76.75 | 53.20 | 53.20 |
| Gloss (20°) | 68.28 | 63.76 | 74.82 | 66.30 | 62.78 | 15.70 |
| Fluidity | fluid | fluid | fluid | fluid | fluid | viscous + poorly milled |

The pigments used were:
Pigment A - C.I. Pigment Black 7 BLACK FW200 (Degussa)
Pigment B - C.I. Pigment Blue 15:2 MONASTRAL Blue FNX (ex ICI)
Pigment C - C.I. Pigment Red 177 CROMOPHTAL Red A2B (Ciba Geigy)
Pigment D - C.I. Pigment Red 101 BAYFERROX Red 110H (Bayer)
Pigment E - C.I. Pigment White 6 TIOXIDE TR92 (Tioxide)

Example 17

A paint was prepared following the procedure of Example 1 and then applied to an uncoated aluminium panel with a wire wound coating bar (100 micrometer wet film thickness). After air drying the panel was left to stand at room temperature (21°±2° C.) for 4 days to allow for full curing and the loss of any further volatile components. The 20° gloss of the paint film was measured and the panel immersed in water at 80° C. for 24 hours. The coating was then assessed at regular intervals for any signs of shrinkage, blistering, or loss of adhesion. The results are tabulated in Table 6.

Comparative Examples 8–11

The procedure of Example 17 was repeated using paints prepared from the formulations given in Table 4 in which the dispersing agent and the water-insoluble resin in the millbase have been replaced with a water soluble dispersing resin. The details of the resins used are as follows:

a) NEOCRYL BT24 (Zeneca Resins), a 45% solids acrylic copolymer emulsion solubilised by the addition of a 50% solution of 2-dimethylamino-ethanol (DMAE) to pH 9±1;

b) JONCRYL 61 (S. C. Johnson), a 35% solids acrylic resin solution.

TABLE 5

|  | CE. 8 | CE. 9 | CE. 10 | CE. 11 |
|---|---|---|---|---|
| a) NEOCRYL BT24 | 11.67 | 15.95 |  |  |
| b) JONCRYL 61 |  |  | 15.00 | 20.50 |
| Water | 11.34 | 6.42 | 8.92 | 3.42 |
| 50% DMAE Solution | 0.91 | 1.55 |  |  |
| DEHYDRAN 1293 | 0.32 | 0.32 | 0.32 | 0.32 |
| Propylene Glycol | 3.76 | 3.76 | 3.76 | 3.76 |
| C.I. Pigment Red 122 | 7.00 | 7.00 | 7.00 | 7.00 |
| Letdown NEOCRYL XK90 | 70.00 | 70.00 | 70.00 | 70.00 |

The results are tabulated in Table 6.

TABLE 6

| Example | Gloss | Paint Film Assessment |
|---|---|---|
| 17 | 64.80 | After 24 hours - coating remains intact with no trace of blisters, shrinkage or loss of adhesion. |
| Comp Ex 8 | 53.43 | After 10 minutes - 100% coverage of very fine blisters. |
| Comp Ex 9 | 39.42 | After 10 minutes - 100% coverage of blisters, 0.5–1.0 mm in diameter. |
| Comp Ex 10 | 62.88 | After 10 minutes - band of 2–3 mm blisters all round panel edge. |
| Comp Ex 11 | 58.68 | After 10 minutes - 100% coverage of blisters, 2–3 mm around edges, 1–2 mm in centre. |

Example 18

2-Naphthol-10EO (0.48 g) was dissolved in 7.69 g water in a 60 ml capacity screw cap bottle. The solution was shaken vigorously for 15 seconds and the height of the foam above the liquid surface measured. Then, 5.84 g of a 42% solids styrene-acrylic copolymer emulsion, NEOCRYL XK62 (Zeneca Resins), 65 g 3 mm glass beads and 3.5 g MONOLITE Rubins 3B were added to the bottle and the mixture milled for 45 minutes on a Red Devil shaker. The height of foam above the liquid surface was measured immediately after milling. The highly fluid dispersion so produced was diluted to a paint by the addition of a prepared mixture of 35.0 g NEOCRYL XK62 and 2.0 g ethylene glycol monobutylether. The paint was applied to a panel as described in Example 1 and the 20° gloss value measured. The results are tabulated in Table 7.

Comparative Examples 12 and 13

The procedure of Example 18 was repeated replacing the 2-naphthol-10EO with nonylphenol-15EO, SYNPERONIC NP15 (ICI), (Comp Ex 12) and $C_{13/15}$ synthetic alcohol +11EO, SYNPERONIC A11 (ICI) (Comp Ex 13), respectively. The results are tabulated in Table 7.

TABLE 7

|  | Solution Foam Height | Mill-base Foam Height | 20° Gloss Value |
|---|---|---|---|
| Example 18 | 8 mm | 5 mm | 57.48 |
| Comp Ex 12 | 60 mm | aerated throughout | 47.78 |
| Comp Ex 13 | 60 mm | and full of foam | 48.06 |

Comparative Example 14

Example 18 was repeated except that the styrene-acrylic copolymer emulsion in the millbase was replaced with water. The 20° gloss of the final paint film was only 52.06 units and the paint film contained a number of large undispersed pigment particles.

Example 19

2-Naphthol-10EO (0.48 g) was dissolved in 9.66 g water in a 60 ml capacity screw cap bottle. The solution was shaken vigorously for 15 seconds and the height of the foam above the liquid surface measured. Then 3.86 g of URADIL SZ251 G3Z-70 (DSM Resins), a 70% active saturated polyester resin dissolved in a butylglycol/water/triethylamine mixture, 65 g 3 mm glass beads and 3.5 g MONOLITE Rubine 3B (ICI) were added to the bottle and the mixture milled for 45 minutes on a Red Devil shaker. The height of foam above the liquid surface was measured immediately after milling. The highly fluid dispersion so produced was diluted to a paint by the addition of a prepared mixture of 12.27 g URADIL SZ251 G3Z-70, 6.24 g CYMEL 303 (American Cyanamid), a 100% active low molecular weight melamine-formaldehyde resin, 0.14 g 2-dimethylaminoethanol and 0.70 g water. The paint was applied to a primed metal panel with a wire wound coating bar (100 micrometer wet film thickness), dried at 160° C. for 15 minutes and the 20° gloss value of the resultant smooth film measured. The results are tabulated in Table 8.

Comparative Examples 15 and 16

The procedure of Example 19 was repeated replacing the 2-naphthol-10EO with nonylphenol-15EO, SYNPERONIC NP15 (ICI) (Comp Ex 15) and $C_{13/15}$ synthetic alcohol +11EO, SYNPERONIC A11 (ICI) (Comp Ex 16), respectively. The results are tabulated in Table 8.

TABLE 8

|  | Solution Foam Height | Mill-base Foam Height | 20° Gloss Value |
|---|---|---|---|
| Example 19 | 7 mm | no foam | 75.76 |
| Comp Ex 15 | 32 mm | 32 mm | 69.86 |
| Comp Ex 16 | 60 mm | 35 mm | 56.64 |

Comparative Example 17

Example 19 was repeated except that the URADIL SZ251 G3Z-70 in the millbase was replaced with water. The 20° gloss of the final paint film was only 54.98 units.

Example 20

A mixture of 47 g water, 3.0 g 2-naphthol-10EO, 20 g JONCRYL 74, (S. C. Johnson), a 47% solids rheology controlled acrylic polymer emulsion, and 30 g C.I.Pigment Red 57:1 (LITHOL Rubine 4569, ex BASF) was dispersed with a high speed disc disperser at 3100 rpm and then ground on a red-devil shaker. After standing for 7 days the dispersion retained its excellent water-thin rheology and was let down into a finished ink by the addition of a prepared mixture of JONCRYL 74 and water containing 0.5% SURFYNOL 104E (Air Products), a defoaming surfactant commonly used as a pigment wetting agent, grinding aid and defoamer in printing inks and comprising a 50% solution of 2,4,7,9-tetra methyl-5-decyn-4,7-diol in ethylene glycol. The ink was printed on polyethylene stock with an Analox roller and was drawn down on card using a wire wound bar (24 micrometer wet film thickness). The ink was then tested for optical density, gloss, opacity and foaming and the results are given in Table 9.

Comparative Example 18

A mixture of 49 g water, 1.0 g SURFYNOL 104E, 20 g JONCRYL 74, and 30 g C.I.Pigment Red 57:1, LITHOL Rubine 4569 (BASF) was dispersed with a high speed disc disperser at 3100 rpm and then ground on a red-devil shaker. The resulting dispersion was very viscous and had not reached an acceptable grind. To reduce the viscosity and permit effective grinding, an extra 10 g of water was required. After standing for 7 days, the rheology of the dispersion was thixotropic and it was let down into a finished ink by the addition of a prepared mixture of JONCRYL 74 and water containing 0.5% SURFYNOL 104E, the quantities being adjusted so that the ink contained the same amounts of pigment, resin, and water as the ink of Example 20. The ink was coated and tested as in Example 20 and the results are given in Table 9.

TABLE 9

|  | Ex 20 | Comp Ex 18 |
|---|---|---|
| Optical density | 1.68 | 1.45 |
| 60° Gloss | 38.1 | 32.9 |
| Opacity (5 = maximum coverage) | 5 | 2 |
| Foam (5 = all foam) | 2 | 3 |

Example 21 and Comparative Example 19

The procedure of Example 20 was repeated using the formulations given in Table 10 and the results are tabulated in Table 11.

TABLE 10

|  | Ex 21 | Comp Ex 19 |
|---|---|---|
| C.I. Pigment Blue 15:4 (1) | 30 g | 30 g |
| JONCRYL 74 | 20 g | 20 g |
| 2-naphthol-10EO | 2.25 g |  |
| SURFYNOL 104E |  | 1.0 g |
| SOLSPERSE 12000 (2) | 0.75 g |  |
| Water | 47 g | 49 g |

(1) IRGALITE Blue GLVO (Ciba-Geigy)
(2) Sulphonated copper phthalocyanine (ICI)

TABLE 11

|  | Ex 21 | Comp Ex 19 |
|---|---|---|
| Millbase viscosity (after 7 days) | water thin | no flow |
| Optical density | 1.86 | 1.68 |
| 60° Gloss | 39.8 | 38.2 |
| Opacity (5 = maximum coverage) | 5 | 2 |

Examples 22–24 and Comparative Examples 20–22

The optimised ink formulations given in Table 12 were obtained by prior evaluation of a wide range of both pigment and agent levels in the millbase for each individual ink formulation. The millbases were prepared by shaking on a Red Devil shaker for 30 minutes with 3 mm glass beads. The fluid dispersions so produced were let down by the addition of a prepared mixture of the components indicated in the let down formulations and then drawn down on polyethylene sheet with a wire wound bar (6 micrometer wet film thickness) and also coated onto paper with a laboratory gravure printer. After air drying the ink films were tested and the results are given in Table 13.

TABLE 12

|  | Ex 22 | Comp Ex 20 | Ex 23 | Comp Ex 21 | Ex 24 | Comp Ex 22 |
|---|---|---|---|---|---|---|
| Millbase |  |  |  |  |  |  |
| C.I. Pigment Yellow 13 (1) | 25.00 | 12.50 |  |  |  |  |
| C.I. Pigment Yellow 28 (2) |  |  | 25.00 | 25.00 |  |  |
| C.I. Pigment Black 7 (3) |  |  |  |  | 27.50 | 27.50 |
| 2-naphthol-10EO | 1.00 | 1.00 |  |  | 3.44 |  |
| JONCRYL 8051 (4) | 19.42 | 19.42 | 19.42 | 19.42 | 19.42 | 19.42 |
| Water | 54.54 | 68.04 | 54.25 | 55.25 | 49.60 | 53.04 |
| FOAMASTER DF177-F (5) | 0.04 | 0.04 |  |  | 0.04 | 0.04 |
| DEHYDRAN 1293 |  |  | 0.33 | 0.33 |  |  |

TABLE 12-continued

|  | Ex 22 | Comp Ex 20 | Ex 23 | Comp Ex 21 | Ex 24 | Comp Ex 22 |
|---|---|---|---|---|---|---|
| Letdown |  |  |  |  |  |  |
| JONCRYL 8051 | 133.20 | 22.20 | 133.20 | 133.20 | 155.40 | 155.40 |
| JONWAX 35 (6) | 10.20 | 1.70 | 10.20 | 10.20 | 11.90 | 11.90 |
| Carbitol (7) | 6.60 | 1.10 | 6.60 | 6.60 | 7.70 | 7.70 |

(1) PERMANENT Yellow GR (Hoechst)
(2) LUTETIA Yellow JR (Zeneca Colours)
(3) PRINTEX 35 (Degussa)
(4) a 45% solids Rheology-controlled acrylic polymer emulsion (S. C. Johnson)
(5) a propoxylated alcohol defoaming agent (Henkel)
(6) a 35% solids polyethylene wax emulsion (S. C. Johnson)
(7) 2-(2-ethoxyethoxy)ethanol

TABLE 13

| Example | 60° Gloss | Optical Density |
|---|---|---|
| Ex 22 | 11.5 | 1.31 |
| Comp Ex 20 | 10.0 | 1.05 |
| Ex 23 | 18.8 | — |
| Comp Ex 21 | 16.2 | — |
| Ex 24 | 27.2 | 1.39 |
| Comp Ex 22 | 22.0 | 1.32 |

The effect of the agent on the adhesion and water sensitivity of the ink was evaluated as follows. After air drying for 2 hours, a printed strip was cut from the polyethylene pattern. The strip was held between both hands placed approximately 1 cm apart. The exposed portion of ink was placed under a running cold tap and the hands were rotated in opposite directions 50 times so as to "crinkle" the ink film. The test was repeated using the ink of the corresponding Comparative Example and the loss of ink from the two films was compared. The tests were also carried out on further strips of polyethylene which after air drying for 2 hours had been immersed in water for 2 hours prior to the "crinkle" test. In both tests the inks prepared from Examples 22 and 23 showed better adhesion and water resistance than the corresponding ink in the Comparative Examples. In Example 24 the use of the agent had no adverse effect on adhesion or resistance compared to the ink in the Comparative Example.

Example 25

2-Naphthol-10EO (0.95 g) was dissolved in 9.10 g water in a 60 ml capacity screw cap bottle. Then 3.95 g of a 33% solids aromatic urethane acrylic copolymer dispersion, NEOPAC E106 (Zeneca Resins), 65 g 3 mm glass beads and 3.5 g MONOLITE Rubine 3B (ICI) were added to the bottle and the mixture milled for 45 minutes on a Red Devil shaker. The dispersion so produced was diluted to a paint by the addition of a prepared mixture of 35.15 g NEOPAC E106 and 1.85 g propylene glycol. The paint was applied to a panel as described in Example 1 and the 20° gloss value measured as 33.96 units.

Comparative Example 23

Example 25 was repeated except that the NEOPAC E106 in the millbase was replaced with water. On diluting the millbase to the final paint, extreme pigment flocculation (commonly known as pigment shock) occurred. Consequently, the final paint film was covered with large undispersed pigment particles and had a 20° gloss value of only 1.58 units.

Example 26

2-Naphthol-10EO (0.48 g) was dissolved in 10.20 g water in a 60 ml capacity screw cap bottle. Then 1.28 g NEOCRYL XK90, 0.16 g DEHYDRAN 1293, 1.88 g propylene glycol, 65 g 3 mm glass beads and 3.5 g MONOLITE Rubine 3B (ICI) were added to the bottle and the mixture milled for 45 minutes on a Red Devil shaker. The highly fluid dispersion so produced was diluted to a paint by the addition of 35 g NEOCRYL XK90. The paint was applied to a panel as described in Example 1 and the 20° gloss value measured as 55.38 units.

I claim:

1. An aqueous mill-base for water-borne paints and inks comprising a finely divided pigment in a composition of water, one or more water-insoluble resins and, as dispersant, a polycyclic aromatic compound having a water-solubilising poly($C_{2-4}$-alkyleneoxy) chain containing from 3 to 50 alkyleneoxy groups, characterised in that the dispersion contains from 3% to 30% by weight of resin with respect to the total weight of water and resin in the dispersion, said mill-base being obtained by grinding the pigment in an aqueous dispersion with the resin and dispersant.

2. A mill-base according to claim 1 wherein the dispersant is of the formula:

$$(A\text{—}X\text{—}Y)_p\text{—}R$$

wherein:

A is a polycyclic aromatic group;

X is a bridging group selected from —O—, —C(O)O—, —S—, —N(H)— and —N(Y)—;

Y is —$(C_3H_6O)_m$—$(C_2H_4O)_n$— or —$(C_2H_4O)_n$—$(C_3H_6O)_m$—;

m is from 0 to 3n;

m+n is from 3 to 50;

p is 1 or 2;

R is H, $C_{1-4}$-alkyl or —$PO_3M_2$ when p is 1;

R is =$PO_3M$ when p is 2; and

M is H, a metal or optionally substituted ammonium.

3. A mill-base according to claim 2 wherein the dispersant is naphth-2-yloxy-$(C_2H_4O)_{10}H$.

4. A mill-base according to claim 1 wherein the resin is selected from acrylic resins, styrene acrylic resins, polyester resins, polyurethane resins and acrylic-polyurethane resins.

5. An aqueous suspension of unmilled pigment containing one or more water-insoluble resins and a polycyclic aromatic compound having a water-solubilising poly($C_{2-4}$-alkyleneoxy) chain containing from 3 to 50 alkyleneoxy groups.

6. A process for the preparation of a mill-base which comprises submitting an aqueous suspension according to claim 5 to a high shear treatment.

7. A water-borne paint comprising a mill-base according to claim 1.

8. A water-borne ink comprising a mill-base according to claim 1.

9. A water-borne packaging ink comprising a mill-base according to claim 1.

* * * * *